April 23, 1929.  H. G. KELLOGG  1,710,261
MACHINE FOR FORMING INTERCHANGEABLE FASHIONED MOLDINGS
Filed Oct. 20, 1924  2 Sheets-Sheet 1
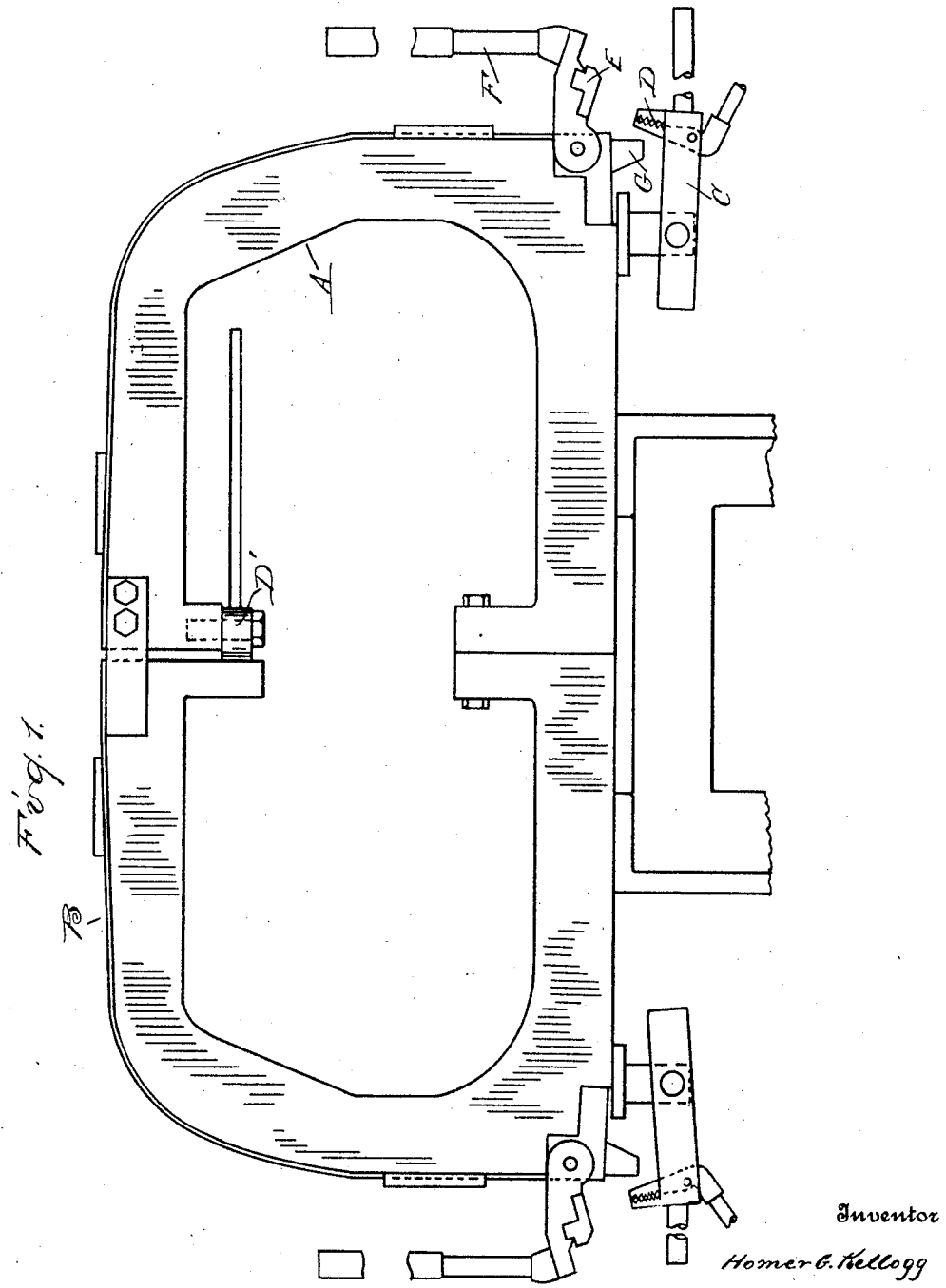
Inventor
Homer G. Kellogg April 23, 1929. H. G. KELLOGG 1,710,261
MACHINE FOR FORMING INTERCHANGEABLE FASHIONED MOLDINGS
Filed Oct. 20, 1924 2 Sheets-Sheet 2
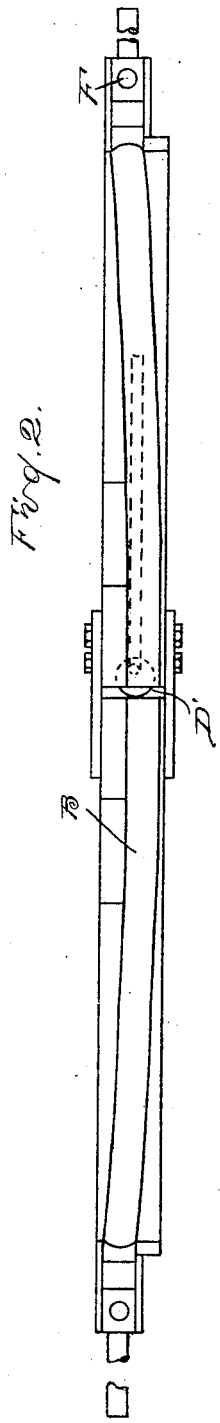
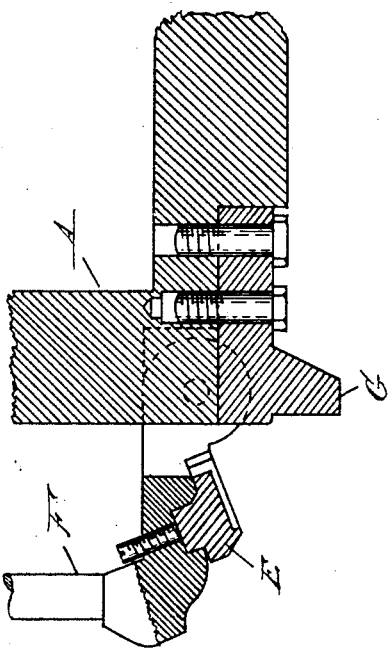
Inventor
Homer G. Kellogg Patented Apr. 23, 1929.

1,710,261

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

MACHINE FOR FORMING INTERCHANGEABLE FASHIONED MOLDINGS.

Application filed October 20, 1924. Serial No. 744,850.

The invention relates to the manufacture of moldings from strips which are fashioned both in cross sectional and longitudinal contour, being designed primarily for use upon automobile bodies. In the commercial production of such bodies it is desirable to have the molding strips so standardized that any strip may be used upon any body to which it corresponds or could be exchanged for any other similar strip. It is also desirable to form such moldings in pairs comprising a body member which is attached to the car body and a cover strip for giving finish and for concealing the attachment means. The cover strip is so formed that it will snap into engagement with the body strip and therefore it is necessary that all of such moldings should be held within close limits to exact sizes and shapes.

It is the object of the present invention to provide means for quickly conforming the moldings as first produced to a master so as to eliminate irregularities. To this end the invention consists in the apparatus as hereinafter set forth.

In the drawings:

Figure 1 is a front elevation of the machine;

Figure 2 is a plan view thereof;

Figure 3 is a section showing the means for shearing the ends of the molding.

A is a frame, which in general contour conforms to the shape of the body over which the molding strip is to be laid. The peripheral portion of this frame is provided with a guide strip B which is bent or fashioned transversely to the plane of the main frame to the form required. C are levers fulcrumed on the lower portion of the frame A and provided with clamping jaws D for engaging the end portion of a molding strip. These levers are capable of exerting sufficient pull upon the molding to draw the same into close conformity to the guide B. D' is a cam or other means for spreading the portions of the frame on opposite sides of the center thereof so as to enact further tension upon the molding strip which is in engagement with the guide B. E is a shearing blade fashioned to give the desired shape to the end of the molding strip. This shearing member is located above the levers C, being operated by a lever handle F and cooperating with a stationary shearing blade G mounted on the frame. Two shearing blades E are associated with the frame A adjacent each end of the molding strip so that both ends may be sheared to give the desired shape and the strip cut to proper length after the elongation thereof due to the stretching during shaping.

In operation, the molding strips which are fashioned to approximate form in longitudinal contour are successively placed on the guide strip B and are then engaged by the clamps D of the levers C, after which a downward pull may be exerted on the strip. The operator then actuates the cam D' so as to spread the portions of the frame on opposite sides of its longitudinal center, which will further stretch the molding strip. At the completion of this operation the strip, which has been slightly elongated, will exactly conform to the guide and will retain this form after removal from the frame.

What I claim as my invention is:

1. The combination with a guide fashioned in longitudinal contour and of a cross-section to receive a molding strip, of means of longitudinally straining said molding strip while in engagement with said guide to permanently conform the same to the contour thereof, and means for trimming the ends of said strip while in engagement with the guide.

2. The combination with a frame of fashioned contour, of a guide mounted on said frame conforming to the shape thereof and also fashioned transversely, said guide being adapted to receive a molding strip, levers mounted on said frame, clamping jaws upon said levers for engaging the ends of the molding strip, whereby said levers can tension the same upon said guide, means for expanding said frame and guide on opposite sides of the center thereof to strain said molding strip, and means for shearing the ends of said strip while in engagement with said guide.

3. The combination with a fashioned guide adapted to receive a molding strip, of means for longitudinally straining said molding strip while in engagement with said guide to permanently conform the same to the contour thereof, and means arranged against the ends of the molding strip for shearing the same to length after the elongation due to the longitudinal straining thereof.

4. The combination with a guide adapted to receive a molding strip, of means acting upon said molding while the same is in engagement with said guide to permanently conform the molding to the contour of the said guide, and means associated with said guide adjacent one end of said molding for shearing the same to length after the operation of said first mentioned means.

5. The method of securing uniformity in bending moldings or the like which comprises providing a two-part form, each part presenting a portion of the desired complete contour and having means for expanding the parts, applying a preformed molding or the like thereto and rigidly but independently securing the ends, and then setting the molding to the exact contour by expanding the parts of the form to a predetermined degree.

In testimony whereof I affix my signature.

HOMER G. KELLOGG.